(12) United States Patent
Hatakeyama et al.

(10) Patent No.: US 10,343,603 B2
(45) Date of Patent: Jul. 9, 2019

(54) IMAGE PROCESSING DEVICE AND IMAGE PROCESSING METHOD

(71) Applicants: DENSO TEN Limited, Kobe-shi, Hyogo (JP); TOYOTA JIDOSHA KABUSHIKI KAISHA, Toyota-shi, Aichi (JP)

(72) Inventors: Yukiko Hatakeyama, Kobe (JP); Kouei Kiyo, Kobe (JP); Tamaki Takeuchi, Kobe (JP); Rie Habuta, Kobe (JP); Akinari Motohiro, Kobe (JP); Tomoyuki Sato, Kobe (JP); Kohei Maejima, Nisshin (JP); Atsutoshi Sakaguchi, Toyota (JP); Masahiro Takahashi, Toyota (JP)

(73) Assignees: DENSO TEN LIMITED, Kobe (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/838,560

(22) Filed: Dec. 12, 2017

(65) Prior Publication Data
US 2018/0186287 A1 Jul. 5, 2018

(30) Foreign Application Priority Data
Jan. 4, 2017 (JP) .................................. 2017-000248

(51) Int. Cl.
*B60Q 9/00* (2006.01)
*B60R 1/00* (2006.01)

(52) U.S. Cl.
CPC ................ *B60Q 9/008* (2013.01); *B60R 1/00* (2013.01); *B60R 2300/301* (2013.01);
(Continued)

(58) Field of Classification Search
CPC ..... B60Q 9/008; B60R 1/00; B60R 2300/307; B60R 2300/60; B60R 2300/8093; B60R 2300/303
See application file for complete search history.

(56) References Cited

U.S. PATENT DOCUMENTS

| | | | |
|---|---|---|---|
| 2004/0105579 A1* | 6/2004 | Ishii | ......................... B60R 1/00 382/154 |
| 2007/0003162 A1* | 1/2007 | Miyoshi | .................. G06T 15/20 382/276 |

(Continued)

FOREIGN PATENT DOCUMENTS

| | | |
|---|---|---|
| JP | 2010-48716 A | 3/2010 |
| JP | 2012-138876 A | 7/2012 |

(Continued)

*Primary Examiner* — Shawn S An
(74) *Attorney, Agent, or Firm* — Oliff PLC

(57) ABSTRACT

An image processing device according to an embodiment includes an image acquisition unit, an information acquisition unit, a generation unit, a composition unit, a determination unit, and a display control unit. The image acquisition unit acquires a captured image where an image of an environment of a vehicle is captured by an image-capturing device. The information acquisition unit acquires positional information regarding a detected position of an obstacle that exists in an environment of the vehicle. The generation unit generates a virtual viewpoint image where an environment of the vehicle is viewed from a virtual viewpoint, based on the captured image. The composition unit composites a notification image that provides notification of existence of the obstacle at the detected position with the virtual viewpoint image. The display control unit controls a display format of the notification image that is composited with the virtual viewpoint image, based on the positional information.

5 Claims, 9 Drawing Sheets

(52) U.S. Cl.
CPC ... *B60R 2300/303* (2013.01); *B60R 2300/307* (2013.01); *B60R 2300/60* (2013.01); *B60R 2300/8093* (2013.01)

(56) References Cited

U.S. PATENT DOCUMENTS

| | | | | |
|---|---|---|---|---|
| 2010/0290774 | A1* | 11/2010 | Matsuoka | B60Q 1/24 396/155 |
| 2012/0327238 | A1* | 12/2012 | Satoh | B60R 1/00 348/148 |
| 2014/0062759 | A1 | 3/2014 | Morikawa et al. | |
| 2016/0212384 | A1* | 7/2016 | Sawada | H04N 7/181 |
| 2017/0096106 | A1* | 4/2017 | Higuchi | B60R 1/00 |

FOREIGN PATENT DOCUMENTS

| | | |
|---|---|---|
| JP | 2012-188057 A | 10/2012 |
| JP | 2012-257106 A | 12/2012 |
| JP | 2014-52274 A | 3/2014 |
| JP | 2016-52867 A | 4/2016 |

\* cited by examiner

IMAGE PROCESSING DEVICE AND IMAGE PROCESSING METHOD

CROSS-REFERENCE TO RELATED APPLICATION

This application is based upon and claims the benefit of priority of the prior Japanese Patent Application No. 2017-000248, filed on Jan. 4, 2017, the entire contents of which are incorporated herein by reference.

FIELD

The embodiment discussed herein is directed to an image processing device and an image processing method.

BACKGROUND

For example, a device has conventionally been known that detects an obstacle that exists in an environment of a vehicle by using a sensor of a radar device or the like and presents a result of detection to a user. For example, in Japanese Laid-open Patent Publication No. 2012-188057, in a case where an obstacle is detected, a detection range of a sensor is superimposed and displayed on a captured image that is captured by a camera.

However, a conventional technique has room for further improvement in that a position of an obstacle is readily recognized.

For example, in a conventional technique as described above, a range capable of detecting an obstacle is merely presented to a user and a position of a detected obstacle, per se, is not presented to such a user. Accordingly, there is a possibility that a user overlooks an obstacle.

SUMMARY

An image processing device according to an embodiment includes an image acquisition unit, an information acquisition unit, a generation unit, a composition unit, a determination unit, and a display control unit. The image acquisition unit acquires a captured image where an image of an environment of a vehicle is captured by an image-capturing device. The information acquisition unit acquires positional information regarding a detected position of an obstacle that exists in an environment of the vehicle. The generation unit generates a virtual viewpoint image where an environment of the vehicle is viewed from a virtual viewpoint, based on the captured image. The composition unit composites a notification image that provides notification of existence of the obstacle at the detected position with the virtual viewpoint image. The display control unit controls a display format of the notification image that is composited with the virtual viewpoint image, based on the positional information.

DESCRIPTION OF EMBODIMENT

Hereinafter, an embodiment of an image processing device and an image processing method as disclosed in the present application will be described in detail, with reference to the accompanying diagrams. Additionally, the present invention is not limited by such an embodiment(s).

1. Outline of Obstacle Presentation System

Figure 1A:
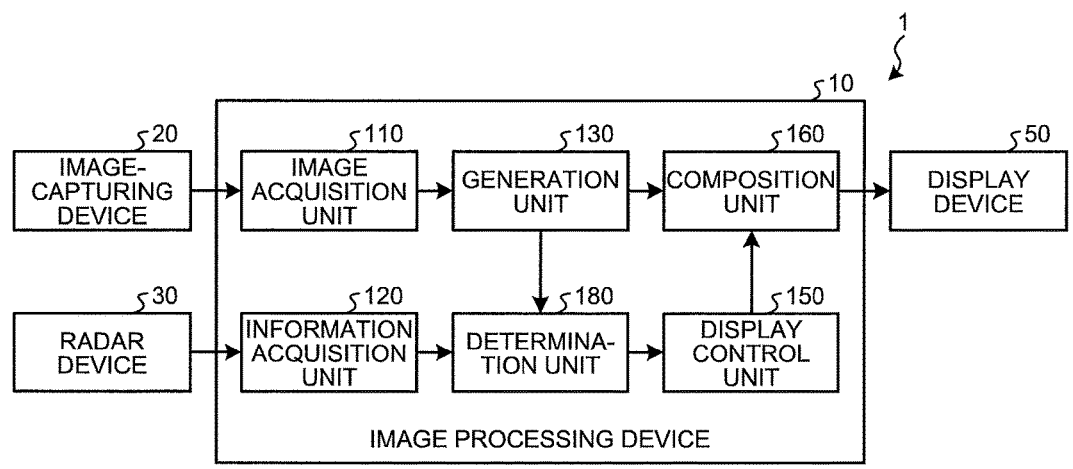
FIG. 1A to FIG. 1C are diagrams illustrating an outline of an obstacle presentation system according to an embodiment.
Figure 1B:
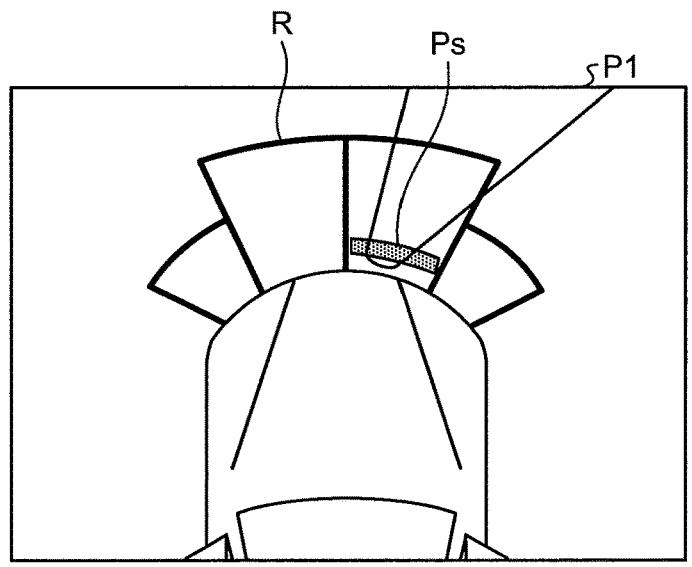
Figure 1C:
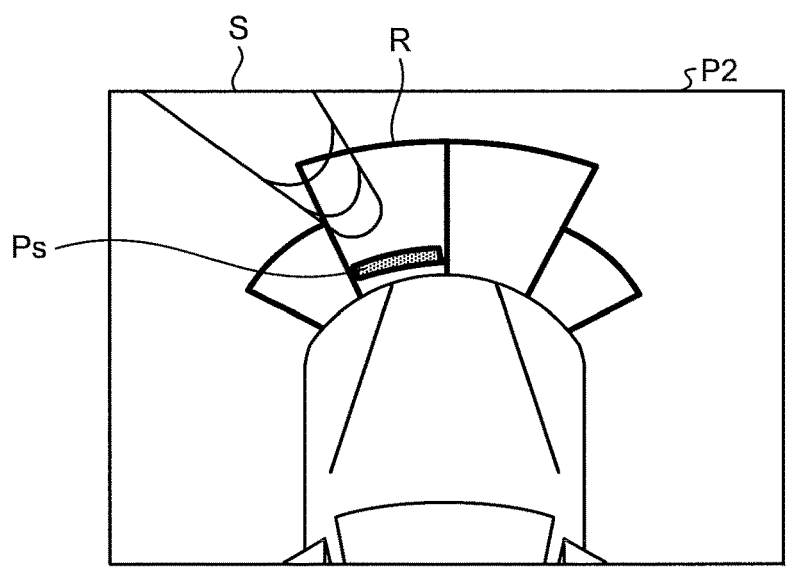

An outline of an obstacle presentation system 1 according to an embodiment will be described by using FIG. 1A to FIG. 1C. FIG. 1A to FIG. 1C are diagrams illustrating an outline of the obstacle presentation system 1 according to an embodiment. The obstacle presentation system 1 is mounted on a vehicle and detects, and presents to a user (driver), an obstacle on a periphery of the vehicle.

The obstacle presentation system 1 executes coordinate transformation of a captured image where an image of a periphery of a vehicle is captured by an image-capturing device to generate a virtual viewpoint image where an environment of the vehicle is viewed from a virtual viewpoint. Furthermore, the obstacle presentation system 1 composites a notification image that provides notification of existence of an obstacle at a detected position of such an obstacle with a virtual viewpoint image. Additionally, a radar device of the obstacle presentation system 1 detects a position of an obstacle. Herein, the obstacle presentation system 1 changes a display format of a notification image that is composited therewith, depending on whether or not an obstacle exists at a position higher than a ground surface, for example, that of a guardrail or the like.

This is because, in a case where an obstacle exists at a position higher than a ground surface, a position of a notification image (detected position of an obstacle) on a virtual viewpoint image is different from a position of an obstacle that appears in the virtual viewpoint image. That is, a detected position of an obstacle is a position that is detected by a radar device, and hence, as coordinate transformation is executed in accordance with coordinates on a virtual viewpoint image, display on a virtual viewpoint image is executed at a position where an obstacle exists actually.

On the other hand, for a captured image, it is impossible to detect a height of an obstacle. Accordingly, the obstacle presentation system 1 generates a virtual viewpoint image while an obstacle on a captured image is assumed to be provided at a height identical to that of a ground surface. Accordingly, an obstacle on a virtual viewpoint image is displayed while it is assumed to exist at a position farther than an actual obstacle.

Thus, on a virtual viewpoint image, an obstacle that exists at a position higher than a ground surface is displayed at a position different from a detected position provided by a radar device. Accordingly, for example, as a user confirms an obstacle, per se, on a virtual viewpoint image, there is a possibility of false recognition in such a manner that such an obstacle is positioned farther than a detected position of an actual obstacle.

Hence, the obstacle presentation system 1 according to an embodiment changes a display format of a notification image that is composited therewith, depending on whether or not an obstacle exists at a position higher than a ground surface, for example, that of a guardrail or the like. For example, in a case where an obstacle exists at a position higher than a ground surface, a notification image is displayed emphatically.

Thereby, even in a case where an obstacle on a virtual viewpoint image is displaced from a detected position provided by a radar device, it is possible to present a position of the obstacle to a user properly and it is possible for the user to confirm a position of the obstacle more readily.

The obstacle presentation system 1 includes an image processing device 10, an image-capturing device 20, a radar device 30, and a display device 50.

The image-capturing device 20 has, for example, a plurality of (non-illustrated) cameras that are arranged in an environment of a vehicle. Each camera of the image-capturing device 20 captures an image of a periphery of a vehicle with a constant period of time.

The radar device 30 emits a radio wave on a periphery of a vehicle and receives a reflected wave that is reflected from an obstacle, so that an obstacle that exists on a periphery of the vehicle is detected. Moreover, the radar device 30 detects, for example, a distance from a vehicle to an obstacle (that will be described as positional information of an obstacle below) as a position of the obstacle.

The image processing device 10 executes coordinate transformation of a captured image that is captured by the image-capturing device 20 to generate a virtual viewpoint image that is viewed from a virtual viewpoint. The image processing device 10 generates, and outputs to the display device 50, a composite image where a vehicle image or a notification image is composited with a virtual viewpoint image. The image processing device 10 includes an image acquisition unit 110, an information acquisition unit 120, a generation unit 130, a display control unit 150, a composition unit 160, and a determination unit 180.

The image acquisition unit 110 acquires a captured image from the image-capturing device 20. The information acquisition unit 120 acquires positional information of an obstacle from the radar device 30.

The generation unit 130 executes a coordinate transformation process for a captured image that is acquired by the image acquisition unit 110 to generate a virtual viewpoint image where a vehicle is viewed from a virtual viewpoint.

The determination unit 180 determines whether or not an obstacle exists at a position at or above a predetermined height from a ground surface, based on a virtual viewpoint image that is generated by the generation unit 130 and positional information of an obstacle that is acquired by the information acquisition unit 120.

For example, the determination unit 180 determines whether or not an obstacle appears at a position where the obstacle exists on a virtual viewpoint image (detected position) based on positional information of the obstacle to determine whether or not the obstacle exists at a position at or above a predetermined height from a ground surface.

The determination unit 180 determines whether or not an obstacle appears in a region that includes a position where the obstacle exists on a virtual viewpoint image, due to, for example, pattern matching or the like. In a case where an obstacle appears therein, it is determined that the obstacle exists at a position lower than a predetermined height. Furthermore, in a case where an obstacle does not appear therein, it is determined that the obstacle exists at a position at or above a predetermined height from a ground surface.

The display control unit 150 controls a display format of a notification image based on positional information of an obstacle. Furthermore, the display control unit 150 controls a display format of a notification image based on a result of determination that is provided by the determination unit 180. In a case where an obstacle exists at a position at or above a predetermined height from a ground surface, the display control unit 150 controls the composition unit 160 in such a manner that a notification image that indicates existence of the obstacle is displayed emphatically.

The composition unit 160 composites a vehicle image where an appearance of a vehicle is viewed from a virtual viewpoint with a virtual viewpoint image that is generated by the generation unit 130. Furthermore, the composition unit 160 composites a notification image that indicates existence of an obstacle with a virtual viewpoint image at a position where the obstacle exists (detected position of an obstacle), based on positional information of the obstacle that is acquired by the information acquisition unit 120.

Herein, in a case where an obstacle exists at a position at or above a predetermined height from a ground surface, the composition unit 160 emphatically displays a notification image that indicates existence of the obstacle, based on control that is executed by the display control unit 150.

FIG. 1B and FIG. 1C illustrate examples of a composite image that is generated by the composition unit 160. FIG. 1B illustrates a composite image P1 in a case where a notification image is not emphatically displayed and FIG. 1C illustrates a composite image P2 in a case where emphatic display thereof is executed. In examples of FIG. 1B or FIG. 1C, the composition unit 160 composites a notification image Ps with an overview image where a vehicle is viewed from directly above. Additionally, a range image R as illustrated in FIG. 1B or FIG. 1C is an image that indicates a detection range of the radar device 30. Details of a rage image R will be described later by using FIG. 5 to FIG. 7.

In a composite image P1 as illustrated in FIG. 1B, a notification image Ps is displayed with a thin line. On the other hand, in a composite image P2 as illustrated in FIG. 1C, a notification image Ps is emphatically displayed with a thick line. Furthermore, in FIG. 1C, a pole S that is an obstacle is displayed above a notification image Ps and is displaced from an actual position of the obstacle (display position of a notification image Ps).

Accordingly, as a user confirms a pole S on a composite image P2, there is a possibility of falsely recognizing that the pole S is farther than an actual position thereof and moving a vehicle forward. Hence, as illustrated in FIG. 1C, a notification image Ps is emphatically displayed on a composite image P2, so that a user is notified that an obstacle exists in a vicinity thereof and a risk of collision is high. Thereby, it is possible for a user to recognize a position of an obstacle more accurately.

The display device 50 includes, for example, a display and displays a composite image P1 or P2 that is generated by the composition unit 160. Thereby, it is possible to present an obstacle to a user.

Thus, the image processing device 10 according to an embodiment composites a vehicle image and a notification image Ps with a virtual viewpoint image. Herein, the image processing device 10 changes a display format of a notification image Ps depending on whether or not an obstacle exists at a position higher than a ground surface. Thereby, it is possible for a user to readily confirm a position of an obstacle.

2. Details of Obstacle Presentation System

Figure 2:
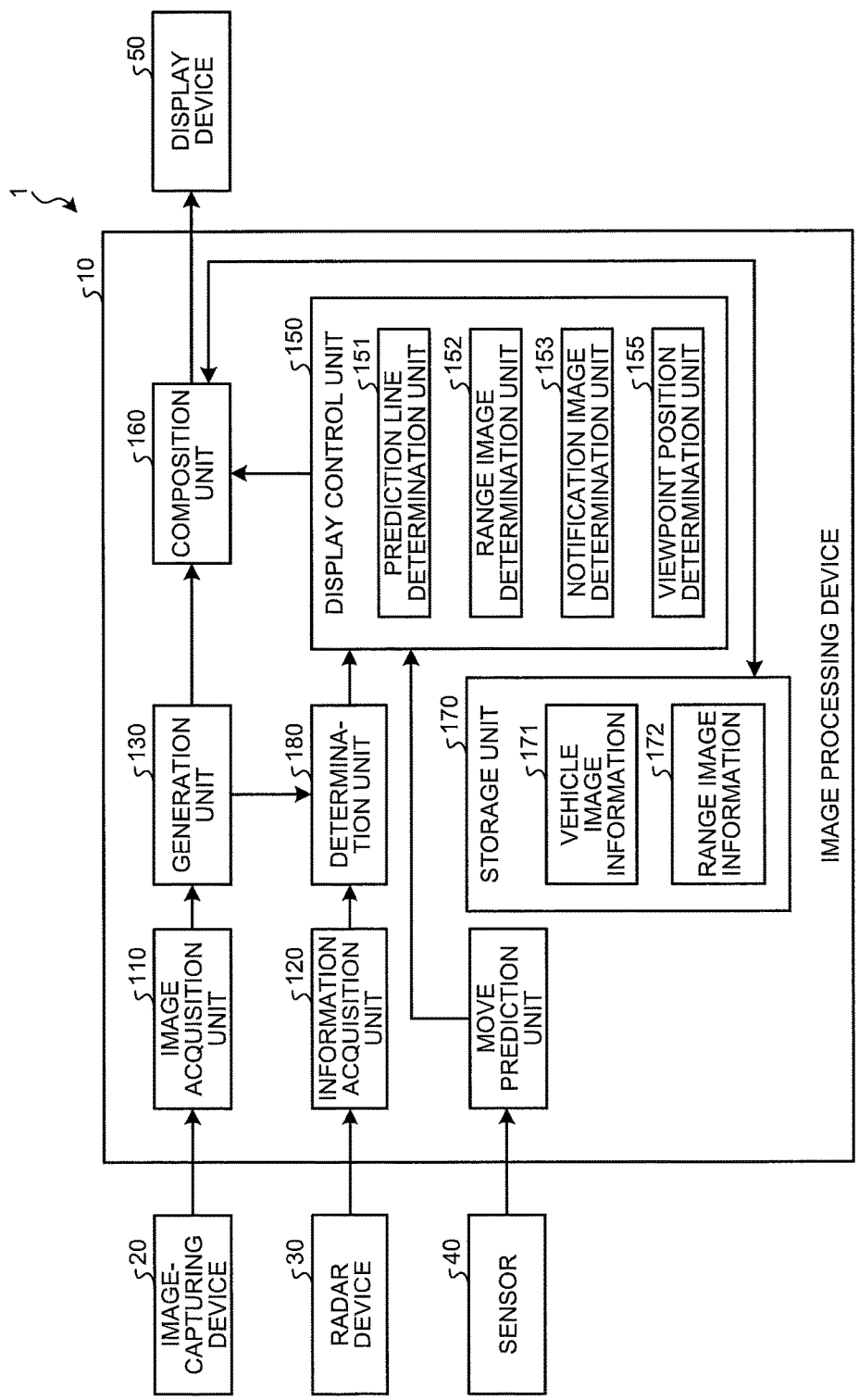
FIG. 2 is a block diagram illustrating a configuration of an obstacle presentation system according to an embodiment.

Next, details of the obstacle presentation system 1 according to an embodiment will be described with reference to FIG. 2 to FIG. 9. FIG. 2 is a block diagram illustrating a configuration of the obstacle presentation system 1 according to an embodiment. Additionally, in FIG. 2, a component needed to describe a feature of an embodiment is represented by a functional block and a description of a general component will be omitted.

In other words, each component as illustrated in FIG. 2 is functionally conceptual and does not have to be physically configured as illustrated in the drawings. For example, a specific configuration of dispersion or integration of respective functional blocks is not limited to that illustrated in the drawings and it is possible to functionally or physically disperse or integrate all or a part thereof in an arbitrary unit to be configured, depending on various types of loads or usage or the like.

As illustrated in FIG. 2, the obstacle presentation system 1 includes an image-capturing device 20, a radar device 30, a sensor 40, an image processing device 10, and a display device 50.

2.1 Image-Capturing Device

The image-capturing device 20 has, for example, a plurality of on-vehicle cameras 20a to 20d with an image-capturing element such as a Charge Coupled Device (CCD) or a Complementary Metal Oxide Semiconductor (CMOS). The image-capturing device 20 outputs captured images that are captured by the on-vehicle cameras 20a to 20d to the image processing device 10.

Figure 3:
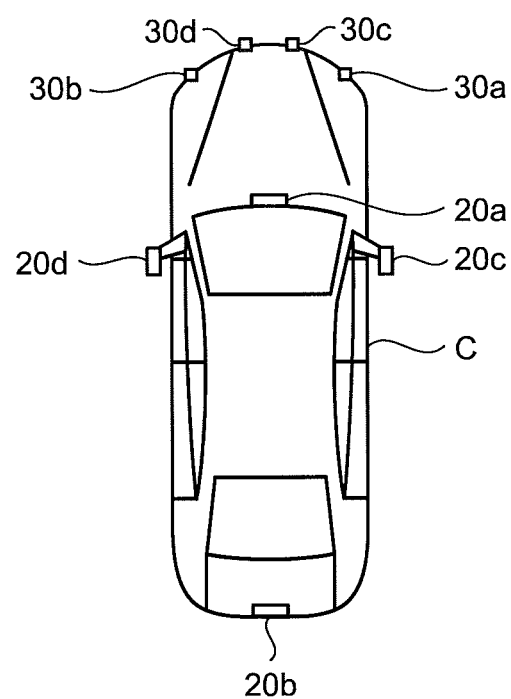
FIG. 3 is a diagram illustrating an example of arrangement of an image-capturing device according to an embodiment.

For example, as illustrated in FIG. 3, the on-vehicle camera 20a is arranged on a front side of a vehicle C and the on-vehicle camera 20b is arranged on a back side of the vehicle C. Furthermore, the on-vehicle camera 20c is arranged on a right side of the vehicle C and the on-vehicle camera 20d is arranged on a left side of the vehicle C. The on-vehicle cameras 20a to 20d execute imaging while respective imaging directions are a front side, a back side, a right side, and a left side of a vehicle. Additionally, FIG. 3 is a diagram illustrating an example of arrangement of the image-capturing device 20.

Furthermore, a wide-angle lens such as a fish-eye lens is adopted for lenses of the on-vehicle cameras 20a to 20d and each of the on-vehicle cameras 20a to 20d has an angle of view that is greater than or equal to 180 degrees. The on-vehicle cameras 20a to 20d are used so that it is possible to execute imaging of an entire periphery of a vehicle C. Additionally, the arrangement or number of the on-vehicle cameras 20a to 20d as illustrated in FIG. 3 is an example and is not limited thereto. As long as it is possible to capture an image of an environment of a vehicle C, the number of on-vehicle cameras may be more or less than four.

2.2 Radar Device

The radar device 30 includes, for example, a plurality of millimeter-wave radars 30a to 30d. The millimeter-wave radars 30a to 30d are arranged on a front side of a vehicle C as illustrated in FIG. 3, and detect an obstacle that exists in front of the vehicle C. The radar device 30 detects positional information such as a distance or an azimuth direction from a vehicle C to an obstacle. The radar device 30 outputs detected positional information to the image processing device 10.

Additionally, the arrangement or number of the radar device 30 as illustrated in FIG. 3 is an example and is not limited thereto. For example, a radar device may also be provided on a back side of a vehicle C to detect an obstacle in back of the vehicle C. Furthermore, the number of millimeter-wave radars that are arranged on a front side of a vehicle C may be more or less than four.

2.3 Image Processing Device

The image processing device 10 as illustrated in FIG. 2 executes coordinate transformation of a captured image that is captured by the image-capturing device 20 to generate a virtual viewpoint image. The image processing device 10 composites a move prediction line of a vehicle C, a vehicle image, a notification image, or the like with a virtual viewpoint image and outputs it to the display device 50.

The image processing device 10 is a microcomputer with a Central Processing Unit (CPU), a storage unit 170, and the like. The image processing device 10 is installed in, for example, an Electric Control Unit (ECU).

A CPU of the image processing device 10 reads and executes, for example, a program that is stored in a ROM, and thereby, functions as an image acquisition unit 110, an information acquisition unit 120, a generation unit 130, a move prediction unit 140, a display control unit 150, a composition unit 160, and a determination unit 180.

Furthermore, it is also possible to compose at least one or all of the image acquisition unit 110, the information acquisition unit 120, the generation unit 130, the move prediction unit 140, the display control unit 150, the composition unit 160, and the determination unit 180 of hardware such as an Application Specific Integrated Circuit (ASIC) or a Field Programmable Gate Array (FPGA).

2.3.1 Image Acquisition Unit

The image acquisition unit 110 sequentially acquires a captured image that is captured by the image-capturing device 20. A captured image that is acquired by the image acquisition unit 110 includes captured images that are captured by the on-vehicle cameras 20a to 20d (see FIG. 3) of the image-capturing device 20. The image acquisition unit 110 outputs an acquired captured image to the generation unit 130.

2.3.2 Information Acquisition Unit

The information acquisition unit 120 acquires positional information that includes a detected position of an obstacle that exists on a periphery of a vehicle C from the radar device 30. The information acquisition unit 120 outputs acquired positional information to the display control unit 150.

2.3.3 Generation Unit

The generation unit 130 executes a coordinate transformation process for a captured image that is acquired by the image acquisition unit 110, and thereby, generates a virtual viewpoint image where an environment of a vehicle C is viewed from an arbitrary virtual viewpoint. Additionally, such a virtual viewpoint is determined by a viewpoint position determination unit 155 of the display control unit 150 as described later.

For example, the generation unit 130 projects (maps) a captured image onto a predetermined projection surface as a coordinate transformation process, and causes an image of a region that is included in a predetermined viewing angle when viewed from an arbitrary virtual viewpoint, among captured images that have been projected onto the predetermined projection surface, to be a virtual viewpoint image.

For example, the generation unit 130 stores a table that indicates a correspondence relationship between positions of data that are included in a captured image and a position of a predetermined projection surface, and projects the data that are included in a captured image onto the predetermined projection surface at a corresponding position by using such a table.

Such a predetermined projection surface has, for example, a substantially hemispherical shape (for example, a bowl shape), where its central region (for example, a bottom portion of a bowl) is at a position of a vehicle C and an outside of a position of the vehicle C (for example, a portion other than a bottom portion of a bowl) corresponds to a region of an environment of the vehicle C. Additionally, a predetermined projection surface does not have to be a curved surface and may be, for example, a planar surface.

The generation unit 130 outputs a generated virtual viewpoint image to the composition unit 160.

2.3.4 Move Prediction Unit

The move prediction unit 140 predicts a course of move of a vehicle C based on a result of an output of the sensor 40. The move prediction unit 140 predicts a course of move of a vehicle C, for example, in a case where a speed of the vehicle C is less than or equal to a predetermined value. The sensor 40 includes, for example, a steering sensor that detects a steering angle or a shift sensor that detects a shift state.

The move prediction unit 140 predicts a direction of move of a vehicle C based on a shift state. For example, the move prediction unit 140 predicts that a direction of move of a vehicle C is forward, if a shift state of the vehicle C is "Drive".

The move prediction unit 140 predicts an angle of move of a vehicle C based on a steering angle. For example, the move prediction unit 140 predicts an angle of move in a case where a vehicle C starts to move, from a steering angle, a dimension and a turning radius of the vehicle C, or the like.

The move prediction unit 140 predicts a predicted course in a case where a vehicle C starts to move, based on a direction of move and an angle of move that have been predicted. The move prediction unit 140 outputs a predicted course to the display control unit 150.

2.3.5 Determination Unit

The determination unit 180 determines whether or not an obstacle exists at a position at or above a predetermined height from a ground surface, based on positional information of the obstacle that is acquired by the information acquisition unit 120 and a virtual viewpoint image that is generated by the generation unit 130.

Figure 4A:
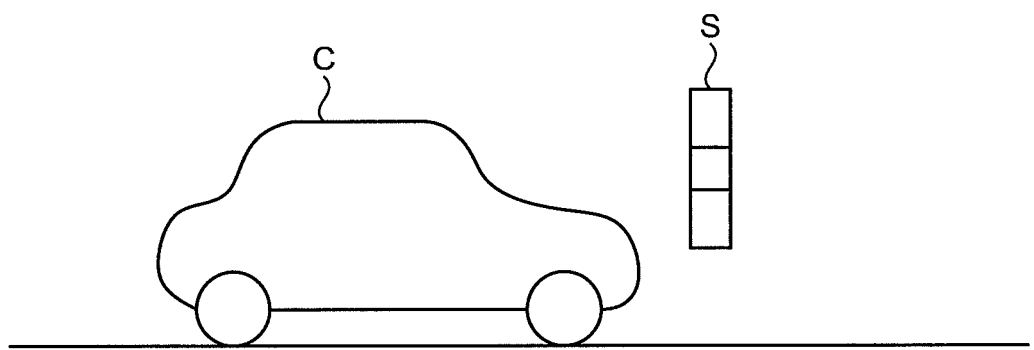
FIG. 4A and FIG. 4B are diagrams illustrating an example of a determination process that is executed by a determination unit according to an embodiment.
Figure 4B:
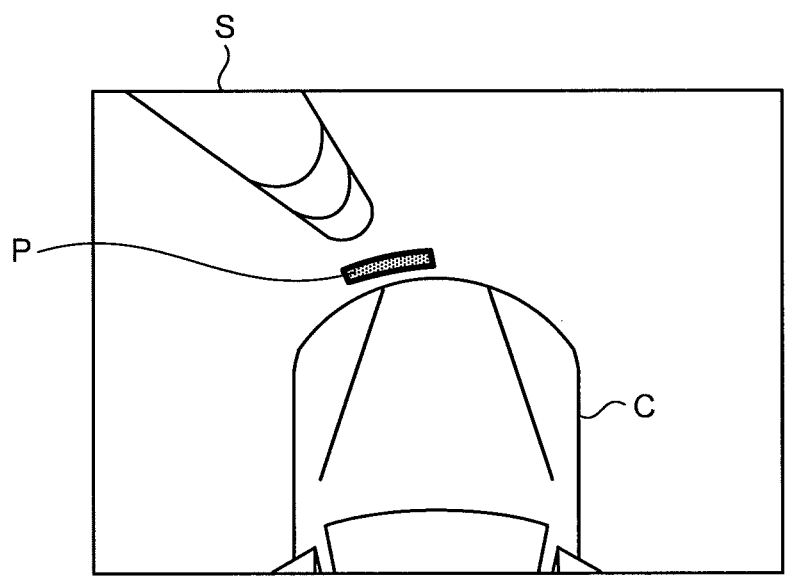

A determination process that is executed by the determination unit 180 will be described by using FIG. 4A and FIG. 4B. FIG. 4A and FIG. 4B are diagrams illustrating an example of a determination process that is executed by the determination unit 180 according to an embodiment.

A case will be described where an obstacle S exists in front of a vehicle C and at a position higher than a ground surface as illustrated in FIG. 4A. In such a case, the determination unit 180 determines whether or not an obstacle S exists at a position P that is detected by the radar device 30 (that will also be described as an actual position P) on a virtual viewpoint image where a vehicle C is viewed from directly above, as illustrated in FIG. 4B. The determination unit 180 detects an obstacle S that appears in a virtual viewpoint image by using, for example, pattern matching, edge detection, or the like, from the virtual viewpoint image.

In a case where a position of an obstacle S that appears in a virtual viewpoint image is different from an actual position P that is detected by the radar device 30 as illustrated in FIG. 4B, the determination unit 180 determines that the obstacle S exists at a position at or above a predetermined height from a ground surface.

On the other hand, in a case where a position of a detected obstacle S is identical to an actual position P that is detected by the radar device 30, the determination unit 180 determines that the obstacle exists at a position lower than a predetermined height from a ground surface. The determination unit 180 outputs a result of determination to the display control unit 150.

Additionally, the determination unit 180 herein applies a process such as pattern matching or edge detection to a virtual viewpoint image to detect an obstacle S from the virtual viewpoint image and is not limited thereto. For example, in a case where it is also possible for the radar device 30 to detect a height of an obstacle S, whether or not the obstacle S exists at a position at or above a predetermined height from a ground surface may be determined based on a height that is detected by the radar device 30.

Furthermore, the determination unit 180 may search only a predetermined range of a virtual viewpoint image that includes an actual position P to detect an obstacle S. Thus, an obstacle S is detected from a predetermined range of a virtual viewpoint image, so that it is possible to reduce an amount of processing of a detection process that is executed by the determination unit 180.

2.3.6 Display Control Unit

The display control unit 150 determines an image that is composited with a virtual viewpoint image by the composition unit 160, so that a display image that is displayed on the display device 50 is controlled. The display control unit 150 determines that at least one of a move prediction line, a vehicle image, a notification image Ps, and a range image that indicates a detection range for an obstacle is composited with a virtual viewpoint image. Furthermore, the display control unit 150 determines a display format of an image to be composited, such as a display color or presence or absence of emphatic display.

The display control unit 150 includes a prediction line determination unit 151, a range image determination unit 152, a notification image determination unit 153, and a viewpoint position determination unit 155.

In a case where the move prediction unit 140 predicts a prediction course, the prediction line determination unit 151 determines that a move prediction line that indicates a predicted course is composited with a virtual viewpoint image, so as to determine that a move prediction line is displayed on the display device 50. For example, the move prediction unit 140 is assumed to predict a course where a vehicle C turns left. In such a case, the prediction line determination unit 151 determines that a move prediction line L1 that extends from a right front wheel of a vehicle C is composited with a virtual viewpoint image.

The range image determination unit 152 determines that a range image R that indicates a detection range of the radar device 30 is displayed on the display device 50.

Figure 5:
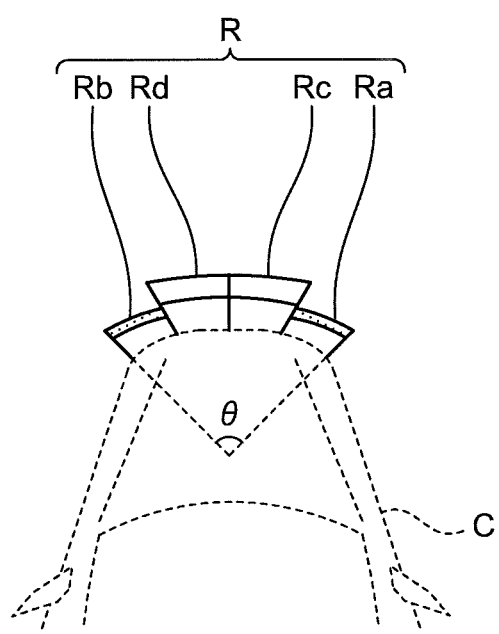
FIG. 5 to FIG. 7 are diagrams for illustrating a range image according to an embodiment.
Figure 6:
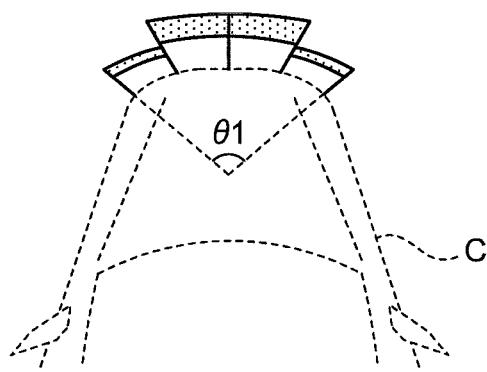
Figure 7:
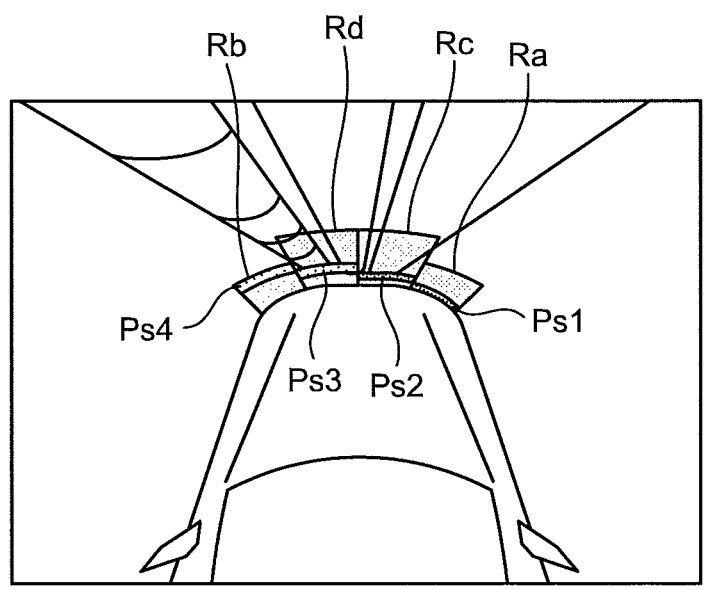

First, a range image R will be described by using FIG. 5 to FIG. 7. FIG. 5 to FIG. 7 are diagrams for illustrating a range image R according to an embodiment. First, a shape of a range image R will be described by using FIG. 5 and FIG. 6.

As illustrated in FIG. 5, a range image R includes a plurality of ranges Ra to Rd. Respective ranges Ra to Rd correspond to detection ranges of millimeter-wave radars 30a to 30d, respectively. As illustrated in FIG. 5, a range image R indicates boundary lines of respective ranges Ra to Rd. Thereby, it is possible to visually confirm each of detection ranges of the millimeter-wave radars 30a to 30d.

Furthermore, as illustrated in FIG. 5, ranges Ra to Rd are represented as concentrically circular and fan-shaped ranges. Herein, as an actual detection range is displayed on a virtual viewpoint image so as to fit with a shape of a vehicle C as illustrated in FIG. 6, a range image R seems to stand as a wall in front of the vehicle C. Accordingly, a central angle θ of a fan shape as illustrated in FIG. 5 is less than a central angle θ1 of a range image R as illustrated in FIG. 6, so that fan shapes of ranges Ra to Rd are emphasized. Thereby, it is possible for the image processing device 10 to represent a range image R on a virtual viewpoint image in such a manner that it is displayed on a ground surface.

Thus, when a range image R is displayed at a predetermined angle on a virtual viewpoint image, such a predetermined angle is changed based on a position of an obstacle or a positional relationship between a vehicle C and the range image R. Thereby, it is possible to present a range image R to a user properly.

Additionally, a range image R as illustrated in FIG. 5 is a range that a user is notified of in a case where the radar device 30 detects an obstacle, and may be different from a range where the radar device 30 is capable of actually detecting an obstacle. That is, the display control unit 150 notifies a user of an obstacle in a case where such an obstacle is included in ranges Ra to Rd based on positional information that is acquired by the information acquisition unit 120. Such a matter will be described later by using FIG. 8.

Furthermore, a range image R includes four ranges Ra to Rd in an example as illustrated in FIG. 5 and is not limited thereto. The number of ranges that are included in a range image R may be more or less than four.

Next, a display format of a range image R will be described by using FIG. 7. As illustrated in FIG. 7, an inside of each of ranges Ra to Rd is displayed with a black color. Herein, insides of ranges Ra to Rd are caused to be transparent. Thereby, it is possible to readily confirm a virtual viewpoint image that is superimposed on ranges Ra to Rd. Furthermore, FIG. 7 illustrates boundary lines of ranges Ra to Rd with a black color, and the boundary lines of ranges Ra to Rd are displayed with, for example, a white color, for example, in a case where a background color is dark. Thereby, it is possible to have visual contact with ranges Ra to Rd more readily. Furthermore, as a boundary line is displayed with a white color, a so-called flare-like display where display is executed radially and with a stepwise-lightened color over a predetermined range toward an outside of ranges Ra to Rd may be added thereto. In such a case, a boundary line is emphasized, so that it is possible to determine ranges Ra to Rd more clearly.

FIG. 2 is returned to. In a case where the information acquisition unit 120 acquires positional information of an obstacle, that is, a case where an obstacle exits in an environment of a vehicle C, the notification image determination unit 153 determines that a notification image Ps is displayed on the display device 50.

The notification image determination unit 153 determines that a notification image Ps is displayed at a position where an obstacle exists, on a virtual viewpoint image, based on positional information that is acquired by the information acquisition unit 120.

First, the notification image determination unit 153 determines where an obstacle is positioned in a detection range. Specifically, the display control unit 150 divides ranges Ra to Rd that are included in a detection range into multiple regions and determines which divided region an obstacle exists in. For example, in FIG. 8, a range Ra or Rb is divided into four regions and a range Rc or Rd is divided into five regions. Additionally, FIG. 8 is a diagram for illustrating a notification image Ps according to an embodiment.

Figure 8:
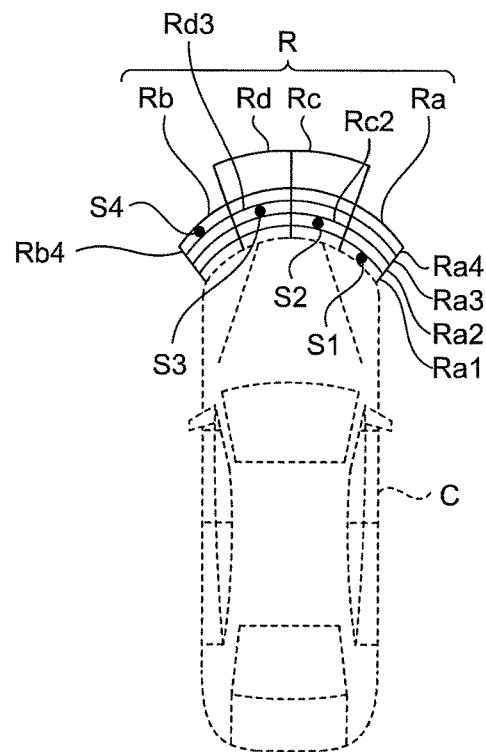
FIG. 8 is a diagram for illustrating a notification image according to an embodiment.

Herein, an obstacle is positioned in each of a region Ra1 of a range Ra, a region Rb4 of a range Rb, a region Rc2 of a range Rc, and a region Rd3 of a range Rd as illustrated in FIG. 8. Additionally, positions of obstacles are represented by points S1 to S4 in FIG. 8. In such a case, the notification image determination unit 153 determines each of regions Ra1, Rb4, Rc2, and Rd3 as a region for displaying a notification image Ps thereon.

The notification image determination unit 153 causes an image where each of regions Ra1, Rb4, Rc2, and Rd3 is filled with a predetermined display color to be a notification image Ps. The notification image determination unit 153 changes such a display color depending on a distance to an obstacle.

For example, as a range Ra in FIG. 8 is described as an example, the notification image determination unit 153 determines a display color of a notification image Ps to be a red color as a high risk in a case where an obstacle exists in a region Ra1 or Ra2 close to a vehicle C among regions Ra1 to Ra4 of the range Ra. Furthermore, the notification image determination unit 153 determines a display color of a notification image Ps to be a yellow color as a low risk in a case where an obstacle exists in a region Ra3 or Ra4 distant from a vehicle C.

As illustrated in FIG. 7, a region Ra1 or Rc2 is close to a vehicle C, and hence, the notification image determination unit 153 determines a display color of a notification image Ps1 or Ps2 that is displayed in a region Ra1 or Rc2 to be a red color. On the other hand, a region Rd3 or Rb4 is distant from a vehicle C, and hence, the notification image determination unit 153 determines a display color of a notification image Ps3 or Ps4 that is displayed in a region Rd3 or Rb4 to be a yellow color.

Herein, for example, the range image determination unit 152 may determine a display color of a range Ra that includes a region Ra2 to be a red color that is identical to a display color of a notification image Ps. Thereby, it is possible to notify a user of existence of an obstacle at a high risk to increase a degree of attention thereto.

Furthermore, for regions Rc and Rd as illustrated in FIG. 7 and FIG. 8, insides of the regions except outer frame lines may be caused to be transparent. In such a case, it is possible to refer to an obstacle that is superimposed on a region Rc or Rd. Furthermore, gradation from a center to an outer frame line may be applied to a color of frame lines of regions Rc and Rd. In such a case, it is possible to readily refer to an outer range of regions Rc and Rd. Additionally, it is preferable to apply transparency or gradation to, in particular, a part outside ranges Ra and Rb. That is because such a part is readily superimposed on an obstacle.

Furthermore, the notification image determination unit 153 determines whether or not a notification image Ps is emphatically displayed based on positional information of an obstacle. In a case where it is determined that an obstacle exists at a position at or above a predetermined height from a ground surface based on positional information of an obstacle, the notification image determination unit 153 displays a boundary line of a notification image Ps with a thick line so that the notification image Ps is displayed emphatically. Furthermore, the notification image determination unit 153 determines whether or not a notification image Ps is emphatically displayed based on a result of determination by the determination unit 180. In a case where the determination unit 180 determines that an obstacle exists at a position at or above a predetermined height from a ground surface, the notification image determination unit 153 displays a boundary line in a notification image Ps with a thick line so that the notification image Ps is displayed emphatically.

Alternatively, the notification image determination unit 153 may blink and display a notification image Ps so as to display the notification image Ps emphatically. Furthermore, the notification image determination unit 153 may change a gray scale of a display color of a notification image Ps based on a height of an obstacle. In such a case, the notification image determination unit 153 displays a notification image Ps so as to be deepen with raising a position where an obstacle exits.

Furthermore, the notification image determination unit 153 may display a notification image Ps in a red color in a case where an obstacle exists at a position at or above a predetermined height even in a region that is usually displayed in a yellow color, for example, a region Rd3 or Rb4.

FIG. 2 is returned to. The viewpoint position determination unit 155 determines a virtual viewpoint position of a virtual viewpoint image that is displayed on the display device 50 based on a prediction course from the move prediction unit 140.

For example, in a case where the move prediction unit 140 predicts that a vehicle C moves in a straight line, the viewpoint position determination unit 155 determines a virtual viewpoint position (directly) above the vehicle C.

2.3.7. Composition Unit

The composition unit 160 composites a move prediction line or the like with a virtual viewpoint image that is generated by the generation unit 130 in accordance with determination by the display control unit 150 to generate a composite image.

For example, in a case where an obstacle exits in an environment of a vehicle C, the composition unit 160 composites a move prediction line, a range image R, a notification image Ps, and a vehicle image with a virtual viewpoint image. In such a case, the composition unit 160 emphatically displays a notification image Ps in a case where an obstacle exists at a position at or above a predetermined height, in accordance with an instruction from the display control unit 150.

Figure 9:
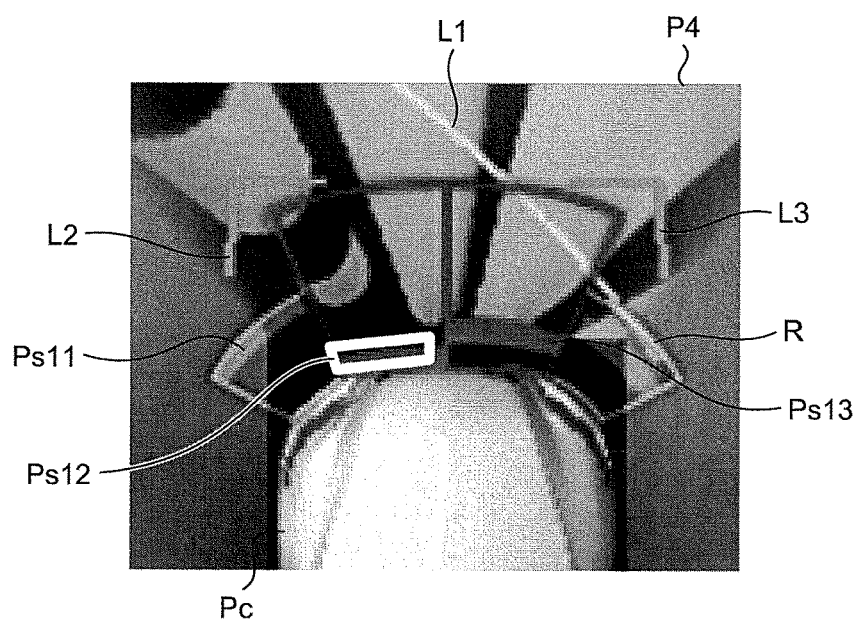
FIG. 9 is a diagram illustrating an example of a composite image that is generated by a composition unit according to an embodiment.

An example of a composite image that is generated by the composition unit 160 will be described by using FIG. 9. FIG. 9 is a diagram illustrating an example of a composite image that is generated by the composition unit 160 according to an embodiment. In an example of FIG. 9, the composition unit 160 composites a notification image Ps or the like with a virtual viewpoint image where a vehicle C is viewed from directly above to generate a composite image P4.

As illustrated in FIG. 9, a composite image P4 is composited with a vehicle image Pc, a move prediction line L1, a range image R, and notification images Psl1 to Psl3. Furthermore, a notification image Psl2 is displayed emphatically. Furthermore, in FIG. 9, guide lines L2 and L3 that indicate predetermined distances from a vehicle C are composited therewith. Thus, the image processing device 10 may display a guide line other than a move prediction line L1. Furthermore, notification images Psl1 to Psl3 may be displayed in such a manner that a width thereof is increased with approaching an obstacle. In such a case, it is possible to readily recognize that an obstacle is closer thereto.

On the other hand, in a case where an obstacle does not exist in an environment of a vehicle C, the composition unit 160 composites therewith a move prediction line L1, a range image R, and a vehicle image Pc to generate a composite image.

Additionally, the composition unit 160 composites a vehicle image Pc or a range image R with a virtual viewpoint image based on, for example, vehicle image information 171 or range image information 172 that is stored in the storage unit 170.

2.3.8. Storage Unit

The storage unit 170 stores information that is used in a process for each unit of the image processing device 10, such as the vehicle image information 171 or the range image information 172. Furthermore, the storage unit 170 stores a result of a process for each unit.

The storage unit 170 includes, for example, a RAM or an HDD. For example, it is possible for a RAM or an HDD to store information for various types of programs or the like dependent on a process that is executed by each unit of the image processing device 10. Additionally, the image processing device 10 may acquire information for various types of programs or the like through another computer or a portable recording medium that is connected by a wired or wireless network.

2.4. Display Device

The display device 50 is, for example, a display that is mounted on a vehicle C. The display device 50 displays a display image that is generated by the image processing device 10. For example, in a case where a (non-illustrated) navigation device is mounted on a vehicle C, the display device 50 may be a display that is included in such a navigation device.

3. Image Generation Process

Figure 10:
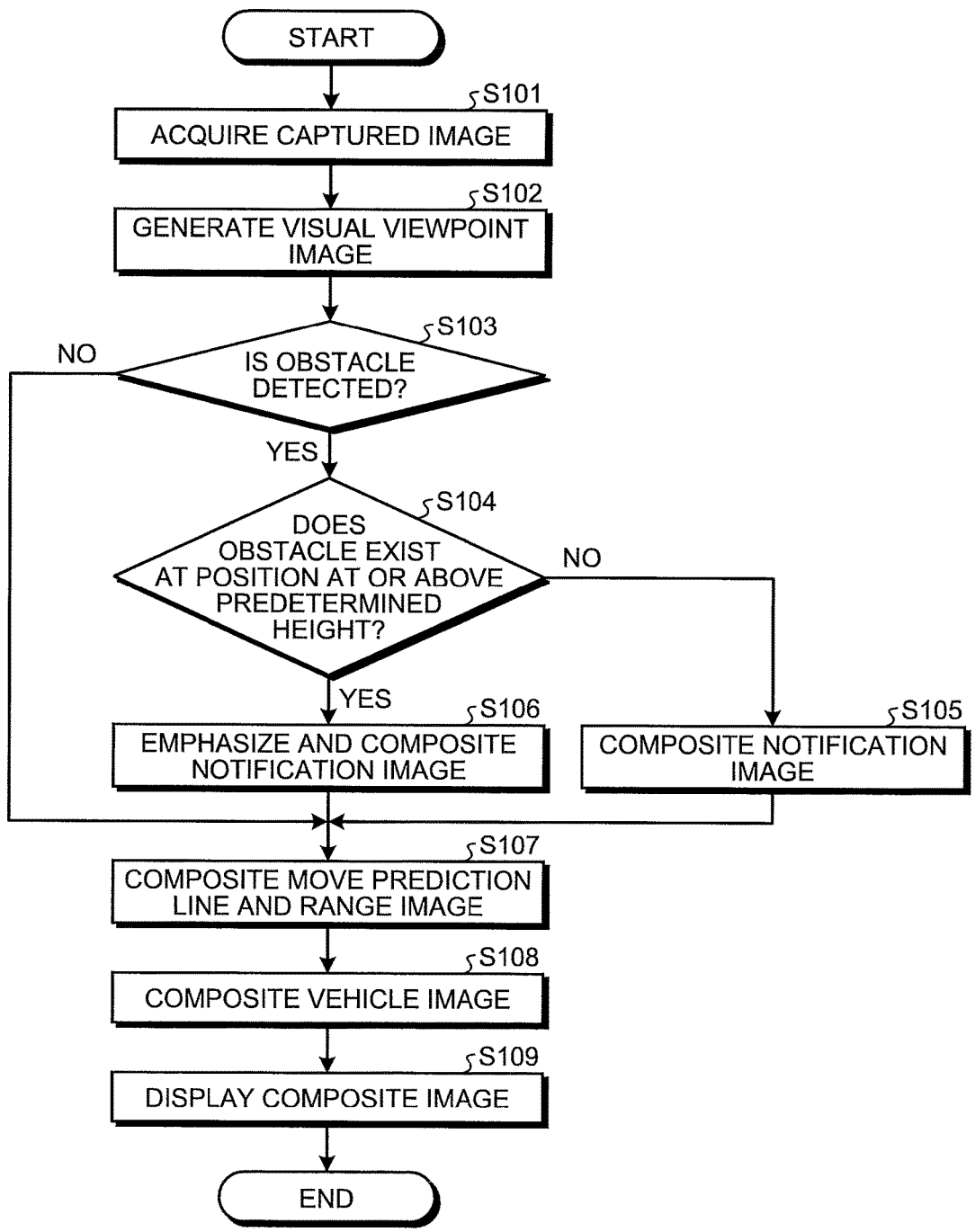
FIG. 10 is a flowchart illustrating processing steps of an image generation process that is executed by an image processing device according to an embodiment.

Next, processing steps of an image generation process that is executed by the image processing device 10 according to an embodiment will be described by using FIG. 10. FIG. 10 is a flowchart illustrating processing steps of an image generation process that is executed by the image processing device 10 according to an embodiment.

The image processing device 10 executes an image generation process in FIG. 10, for example, in a case where a vehicle C moves in a straight line at a predetermined speed or less.

The image processing device 10 executes an image generation process in FIG. 10, for example, at a constant interval for the image-capturing device 20 to capture a captured image. Additionally, an interval for the image processing device 10 to execute an image generation process is not limited to such a constant interval. The image processing device 10 may execute an image generation process, for example, every time a plurality of captured images is acquired, that is, with a period of time longer than such a constant interval.

As illustrated in FIG. 10, the image processing device 10 first acquires a captured image from the image-capturing device 20 (step S101). The image processing device 10 generates a virtual viewpoint image based on an acquired captured image (step S102).

Then, the image processing device 10 determines whether or not an obstacle is detected depending on whether or not the information acquisition unit 120 acquires positional information (step S103). In a case where an obstacle is not detected (No at step S103), the image processing device 10 goes to step S107.

On the other hand, in a case where an obstacle is detected (Yes at step S103), the image processing device 10 determines whether or not an obstacle exists at a position at or above a predetermined height (step S104). In a case where an obstacle exists at a position lower than a predetermined height (No at step S104), the image processing device 10 composites a notification image Ps with a virtual viewpoint image (step S105).

On the other hand, in a case where an obstacle exists at a position at or above a predetermined height (Yes at step S104), the image processing device 10 emphatically displays a notification image Ps and composites it with a virtual viewpoint image (step S106).

The image processing device 10 composites a move prediction line L1 and a range image R with a virtual viewpoint image (step S107) and composites a vehicle image Pc therewith to generate a composite image (step S108). The image processing device 10 outputs a generated composite image to the display device 50 to display the composite image (step S109).

Additionally, orders of processes at step S107 and step S108 may be changed.

Furthermore, the image processing device 10, herein, emphatically displays a notification image Ps depending on whether or not an obstacle exists at a position at or above a predetermined height and is not limited thereto. For example, in a case where an obstacle is detected (Yes at step S103), the image processing device 10 may go to step S105 and immediately emphatically display a notification image Ps and composite it with a virtual viewpoint image. That is, step S104 and step S105 may be omitted. The image processing device 10 controls a display format of a notification image Ps independently of a height of an obstacle and based on a detected position of the obstacle, so that it is possible for a user to readily confirm a position of the obstacle.

As described above, the obstacle presentation system 1 according to an embodiment displays, on the display device 50, a composite image where a vehicle image Pc and a notification image Ps are composited with a virtual viewpoint image. Herein, a notification image Ps is emphatically displayed depending on a height where an obstacle exists. Thereby, it is possible for a user to readily confirm a position of an obstacle.

4. Effect

The image processing device 10 according to the above-mentioned embodiment includes the image acquisition unit 110, the information acquisition unit 120, the generation unit 130, the composition unit 160, the determination unit 180, and the display control unit 150. The image acquisition unit 110 acquires a captured image where an image of an environment of a vehicle C is captured by the image-capturing device 20. The information acquisition unit 120 acquires positional information regarding a detected position of an obstacle that exists in an environment of the vehicle C. The generation unit 130 generates a virtual viewpoint image where an environment of the vehicle C is viewed from a virtual viewpoint, based on the captured image. The composition unit 160 composites a notification image Ps that provides notification of existence of the obstacle at the detected position with the virtual viewpoint image. The display control unit 150 controls a display format of the notification image Ps that is composited with the virtual viewpoint image, based on the positional information.

Thereby, it is possible for a user to recognize an obstacle more readily.

The display control unit 150 of the image processing device 10 according to the above-mentioned embodiment emphatically displays the notification image Ps based on the positional information.

Thereby, it is possible to notify a user of a position of an obstacle properly.

The information acquisition unit 120 of the image processing device 10 according to the above-mentioned embodiment acquires information regarding a detected position from a detection device (radar device 30) that detects the obstacle. The composition unit 160 composites a range image R that indicates a detection range of the detection device (radar device 30) with the virtual viewpoint image.

Thereby, it is possible for a user to recognize a detection range of a detection device, so that it is possible to readily confirm whether or not an obstacle is detected.

The composition unit 160 of the image processing device 10 according to the above-mentioned embodiment composites the range image R that seems to be rendered on a ground surface with the virtual viewpoint image.

Thereby, it is possible for a user to recognize a detection range of the radar device 30 more readily.

The composition unit 160 of the image processing device 10 according to the above-mentioned embodiment composites the range image R that includes boundary lines of the detection ranges of a plurality of the detection devices (millimeter-wave radars 30a to 30d) with the virtual viewpoint image.

Thereby, it is possible for a user to recognize detection ranges of the multiple millimeter-wave radars 30a to 30d more readily.

The composition unit 160 of the image processing device 10 according to the above-mentioned embodiment composites the range image R with the virtual viewpoint image within a range of a predetermined angle and changes the predetermined angle based on the positional information.

Thereby, it is possible to present a range image R to a user properly.

The image processing device 10 according to the above-mentioned embodiment further includes the determination unit 180 that determines that the obstacle exists at a position higher than a ground surface in a case where a display position of the obstacle on the virtual viewpoint image is different from the detected position. The display control unit 150 controls a display format of the notification image Ps that is composited with the virtual viewpoint image in a case where the determination unit 180 determines that the obstacle exists at a position higher than the ground surface.

Thereby, it is possible for the image processing device 10 to determine whether or not an obstacle exists at a position higher than a ground surface. Furthermore, the image processing device 10 controls a display format of a notification image Ps based on a result of determination, so that it is possible to execute notification of an obstacle depending on a risk more properly.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device, comprising:
a processor configured to:
acquire a captured image where an image of an environment of a vehicle is captured by an image-capturing device including an image sensor;
acquire positional information regarding a detected position of an obstacle that exists in the environment of the vehicle;
generate a virtual viewpoint image where the environment of the vehicle is viewed from a virtual viewpoint, based on the captured image;

composite a notification image that provides notification of existence of the obstacle at the detected position with the virtual viewpoint image;

control a display format of the notification image that is composited with the virtual viewpoint image, based on the positional information;

determine that the obstacle exists at a position higher than a around surface, in a case where a display position of the obstacle on the virtual viewpoint image is different from the detected position;

acquire the positional information from a detection device that detects the obstacle;

divide, in accordance with a distance from the vehicle, a range image indicating a detection range of the detection device into a plurality of regions;

generate the notification image to be displayed in a region of the plurality of regions that is corresponding to the detected position of the obstacle, and when the obstacle is determined to exist at the position higher than the ground surface, change a display format of the notification image into an emphatic display; and composite together with the range image, one of the notification image and a notification image whose display format is changed into the emphatic display with the virtual viewpoint image.

2. The image processing device according to claim 1, wherein the processor is further programmed to composite the range image that seems to be rendered on a ground surface with the virtual viewpoint image.

3. The image processing device according to claim 1, wherein the processor is further programmed to composite the range image that includes boundary lines of the detection ranges of a plurality of the detection devices with the virtual viewpoint image.

4. The image processing device according to claim 1, wherein the processor is further programmed to composite the range image with the virtual viewpoint image within a range of a predetermined angle and changes the predetermined angle based on the positional information.

5. An image processing method, comprising:

(a) acquiring a captured image where an image of an environment of a vehicle is captured by an image-capturing device including an image sensor;

(b) acquiring positional information regarding a detected position of an obstacle that exists in an environment of the vehicle;

(c) generating a virtual viewpoint image where an environment of the vehicle is viewed from a virtual viewpoint, based on the captured image;

(d) compositing an obstacle image that indicates the obstacle at the detected position with the virtual viewpoint image and compositing a vehicle image with the virtual viewpoint image to generate a composite image;

(e) controlling a display format of the obstacle image that is composited with the composite image, based on the positional information; and (f) determining that the obstacle exists at a position higher than a ground surface, in a case where a display position of the obstacle on the virtual viewpoint image is different from the detected position, wherein the (a) acquiring includes acquiring the positional information from a detection device that detects the obstacle, the (e) controlling includes:
　dividing, in accordance with a distance from the vehicle, a range image indicating a detection range of the detection device into a plurality of regions;
　generating the notification image to be displayed in a region of the plurality of regions that is corresponding to the detected position of the obstacle, and
　when the obstacle is determined to exist at the position higher than the ground surface, change a display format of the notification image into an emphatic display, and the (d) compositing includes compositing, together with the range image, one of the notification image and a notification image whose display format is changed into the emphatic display with the virtual viewpoint image.

* * * * *